US011034292B2

(12) United States Patent
Glickman et al.

(10) Patent No.: US 11,034,292 B2
(45) Date of Patent: Jun. 15, 2021

(54) VEHICLE GRILLE ASSEMBLY

(71) Applicant: Ford Global Technologies, LLC, Dearborn, MI (US)

(72) Inventors: David Brian Glickman, Southfield, MI (US); Stuart C. Salter, White Lake, MI (US); Darshan Arun Nayak, Northville, MI (US); Paul Kenneth Dellock, Northville, MI (US); Dennis Charles Angellotti, Clawson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 16/527,372

(22) Filed: Jul. 31, 2019

(65) Prior Publication Data

US 2021/0031678 A1    Feb. 4, 2021

(51) Int. Cl.
| | | |
|---|---|---|
| *B60Q 1/28* | (2006.01) | |
| *B60Q 1/00* | (2006.01) | |
| *B60R 13/00* | (2006.01) | |
| *F21V 23/00* | (2015.01) | |
| *F21S 41/25* | (2018.01) | |
| *F21S 45/47* | (2018.01) | |
| *B60K 11/08* | (2006.01) | |
| *F21W 104/00* | (2018.01) | |

(52) U.S. Cl.
CPC ............... *B60Q 1/28* (2013.01); *B60K 11/08* (2013.01); *B60Q 1/0088* (2013.01); *B60R 13/005* (2013.01); *F21S 41/25* (2018.01); *F21S 45/47* (2018.01); *F21V 23/003* (2013.01); *F21W 2104/00* (2018.01)

(58) Field of Classification Search
CPC .. B60Q 1/28; F21S 41/25; F21S 41/47; B60K 11/08; B60K 11/0088; B60R 13/005; F21V 23/003
USPC ........................................................ 362/496
See application file for complete search history.

(56) References Cited

U.S. PATENT DOCUMENTS

| | | | |
|---|---|---|---|
| 8,833,313 B2* | 9/2014 | Lockwood | ........... B60K 11/085 123/41.04 |
| 9,714,749 B1* | 7/2017 | Salter | ........................ B60Q 1/28 |
| 10,059,256 B1* | 8/2018 | Diedrich | ................. B60R 19/52 |
| 10,267,481 B2 | 4/2019 | Salter et al. | |
| 10,281,113 B1* | 5/2019 | Salter | ........................ F21V 9/08 |
| 2008/0035400 A1* | 2/2008 | Wong | ..................... B60K 11/08 180/68.1 |
| 2012/0211293 A1* | 8/2012 | Leanza | .................. B60K 13/02 180/68.3 |

(Continued)

*Primary Examiner* — Bryon T Gyllstrom

(74) *Attorney, Agent, or Firm* — David Coppiellie; Price Heneveld LLP

(57) ABSTRACT

A vehicle grille assembly includes a body panel and a housing coupled to the body panel. The housing includes a front surface and a rear surface. The rear surface defines a cutout. A display assembly is disposed adjacent to the housing and aligned with the cutout. The display assembly includes a light source disposed on a circuit board and a heatsink coupled to the circuit board. The light source emits light towards the front surface of the housing. A deflector is disposed adjacent to the display assembly and includes a base and a guide wall extending vertically from the base. The deflector includes a first surface and a second surface. The deflector defines a first airflow path and a second airflow path.

20 Claims, 5 Drawing Sheets

(56) References Cited

U.S. PATENT DOCUMENTS

| | | | |
|---|---|---|---|
| 2015/0138807 A1* | 5/2015 | Salter | B60Q 1/2661 |
| | | | 362/510 |
| 2017/0210285 A1 | 7/2017 | Kobayashi et al. | |
| 2018/0266646 A1* | 9/2018 | Sanchez | F21S 41/143 |
| 2018/0334088 A1 | 11/2018 | Salter et al. | |
| 2019/0035264 A1 | 1/2019 | Salter et al. | |

* cited by examiner

VEHICLE GRILLE ASSEMBLY

FIELD OF THE DISCLOSURE

The present disclosure generally relates to a vehicle grille assembly. More specifically, the present disclosure relates to a vehicle grille assembly having a display assembly.

BACKGROUND OF THE DISCLOSURE

Automotive vehicles are commonly equipped with grille assemblies that provide for ventilation. Some vehicles may require more ventilation, and other vehicles may require lesser ventilation. In addition, light assemblies of vehicles have been proposed as indicator lights to identify or communicate to a user.

SUMMARY OF THE DISCLOSURE

According to at least one aspect of the present disclosure, a vehicle grille assembly includes a body panel and a housing coupled to the body panel. The housing includes a front surface and a rear surface. The rear surface defines a cutout. A display assembly is disposed adjacent to the housing and aligned with the cutout. The display assembly includes a light source disposed on a circuit board and a heatsink coupled to the circuit board. The light source emits light towards the front surface of the housing. A deflector is disposed adjacent to the display assembly and includes a base and a guide wall extending vertically from the base. The deflector includes a first surface and a second surface. The deflector defines a first airflow path and a second airflow path.

According to another aspect of the present disclosure, a grille assembly for a vehicle includes a circuit board having a first side and a second side. The first side opposes the second side. A plurality of light sources is disposed on the first side of the circuit board. A lens is disposed adjacent to the plurality of light sources. Each light source of the plurality of light sources is configured to emit light towards the lens. A heatsink is coupled to the second side of the circuit board. A deflector has a base and a guide wall and is disposed proximate to the heatsink. The deflector defines at least one airflow path. A controller is configured to selectively activate each light source of the plurality of light sources.

According to another aspect of the present disclosure, a grille assembly includes a circuit board having a first side and a second side. A light source is disposed on the first side of the circuit board. A lens is disposed adjacent to the light source. The light source is configured to emit light through the lens. A deflector is disposed proximate the second side of the circuit board. The deflector includes a base and a guide wall extending from the base. The deflector is spaced-apart from the second side of the circuit board to define an airflow path therebetween.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
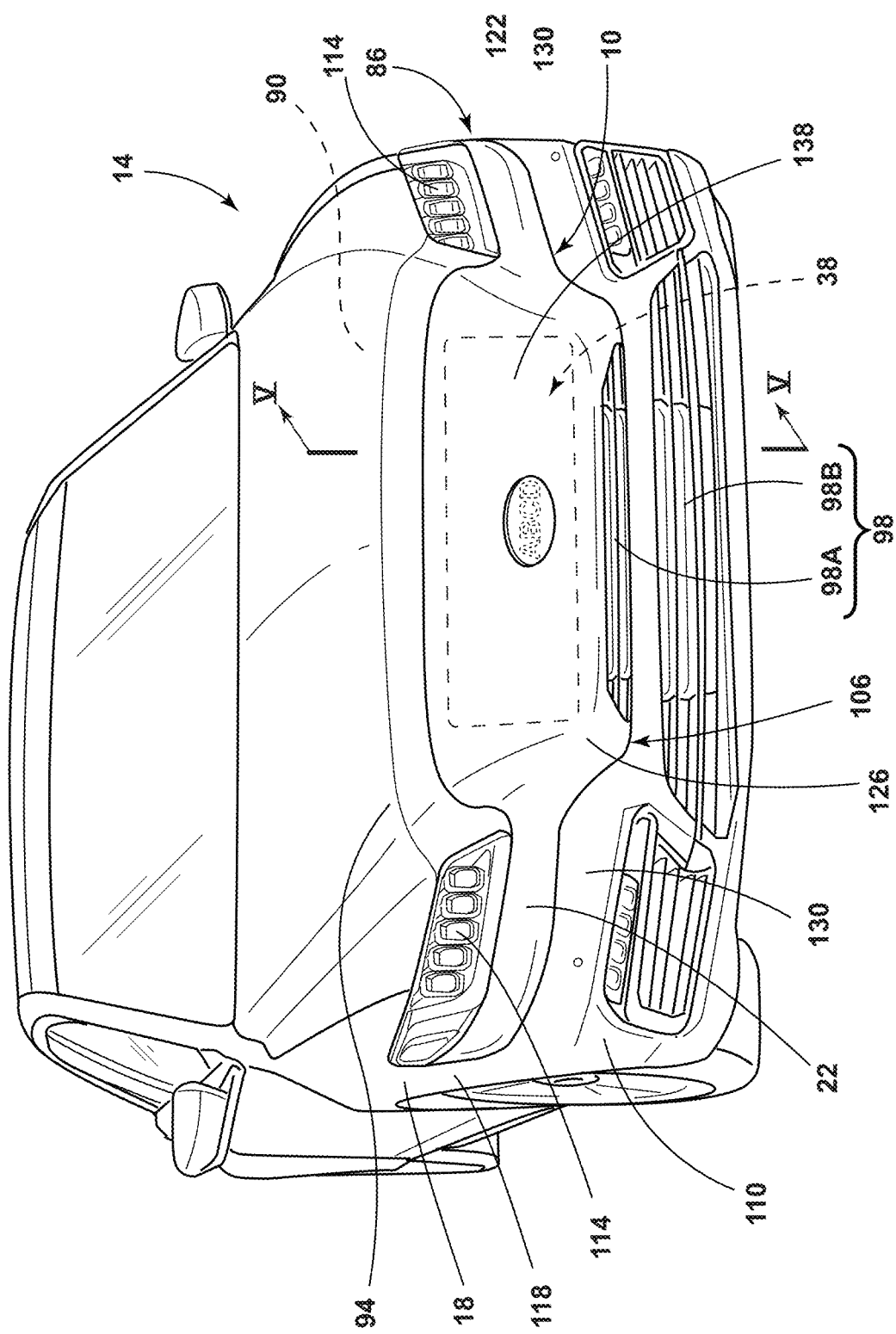
FIG. 1 is a front perspective view of a vehicle having a grille assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, reference numeral 10 generally refers to a grille assembly for a vehicle 14, including a body panel 18 and a housing 22 coupled to the body panel 18. The housing 22 includes a front surface 26 and a rear surface 30. The rear surface 30 defines a cutout 34. A display assembly 38 is disposed adjacent to the housing 22 and is aligned with the cutout 34. The display assembly 38 includes a light source 42 disposed on a circuit board 46 and a heatsink 50 coupled to the circuit board 46. The light source 42 emits light 54 towards the front surface 26 of the housing 22. A deflector 58 is disposed adjacent to the display assembly 38 and includes a base 62 and a guide wall 66 extending vertically from the base 62. The deflector 58 includes a first surface 70 and a second surface 74. The deflector 58 defines a first airflow path 78 and a second airflow path 82.

Referring to FIG. 1, the vehicle 14 is illustrated as a wheeled motor vehicle, such as a sedan, but may also be a crossover, truck, sport utility vehicle, van, or other styles of the vehicle 14. The vehicle 14 may be a manually operated vehicle 14 (e.g., with a human driver), a fully autonomous vehicle 14 (e.g., no human driver), or a partially autonomous vehicle 14 (e.g., may be operated with or without a human driver). Additionally, the vehicle 14 may be utilized for personal and/or commercial purposes, such as for ride-providing services (e.g., chauffeuring) and/or ride-sharing services.

A vehicle-forward portion 86 of the vehicle 14 includes the body panel 18 enclosing an engine compartment 90. The body panel 18 may include and/or be configured as a hood 94. Additionally or alternatively, the vehicle-forward portion 86 of the vehicle 14 includes a grille 98 spaced-apart from the hood 94, which may provide ventilation for the engine compartment 90. In various examples, the vehicle 14 may have an internal combustion engine. In such examples, the grille 98 and/or the grille assembly 10 may provide ventilation for the internal combustion engine. In other examples, the vehicle 14 may be a battery-electric vehicle, a hybrid electric vehicle, a plug-in electric vehicle, or other types of vehicle 14. Electric vehicles 14 may use a smaller ventilation grille 98. However, it is also contemplated that vehicles 14 with internal combustion engines may also use smaller grilles 98, which may affect the ventilation of the engine compartment 90. Additionally, the vehicle 14 generally includes a cooling system 102 disposed within the engine compartment 90. The cooling system 102 typically includes an evaporator, a condenser, and heat exchangers. The cooling system 102 operates to transfer heat away from components within the engine compartment 90. The cooling system 102 generally operates to prevent the engine of the vehicle 14 from overheating. In this way, the cooling system 102 uses a coolant to absorb heat and transfer the heat away from the engine.

Referring still to FIG. 1, the grille assembly 10 may form a continuous surface between the hood 94 and a bumper assembly 106. The grille assembly 10 may form a substantially flat and/or continuous panel coupled to the body panel 18. In various examples, the grille assembly 10 may be substantially planar and/or linear. Accordingly, an exterior surface 110 of the body panel 18 and the front surface 26 of the grille assembly 10 may form a continuous surface. The vehicle 14 may additionally include lamp assemblies 114 (e.g., headlights) proximate first and second side portions 118, 122 of the vehicle-forward portion 86 of the vehicle 14.

Figure 2:
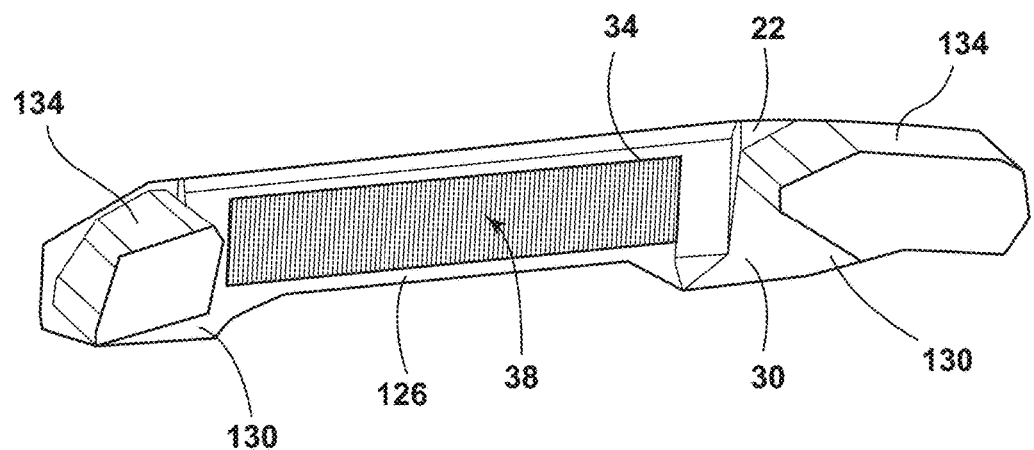
FIG. 2 is a rear perspective view of a housing for a display assembly, according to one example.

The grille assembly 10 may include the housing 22 coupled to the body panel 18 and extending between the first and second side portions 118, 122 of the vehicle 14. The housing 22 may have a variety of configurations. For example, as illustrated in FIG. 1, the housing 22 may have a center portion 126 with a greater height relative to lateral side portions 130, where the lateral side portions 130 extend below the lamp assemblies 114. The lateral side portions 130 may also extend above and/or over the lamp assemblies 114. It is also contemplated that, in various examples, the grille assembly 10 may include daylight running lamps, protective layers, and/or decorative layers without departing from the teachings herein. As illustrated in FIG. 2, the center portion 126 of the housing 22 may have a height less than the lateral side portions 130. In such examples, the lateral side portions 130 of the housing 22 may be configured to extend over and enclose the lamp assemblies 114. The housing 22 may include side casings 134 that extend from the rear surface 30 in a vehicle-rearward direction from the housing 22. The lamp assemblies 114 may be disposed at least partially within the side casings 134.

Referring to FIGS. 1 and 2, the housing 22 includes the front surface 26 and the rear surface 30. As illustrated, the front surface 26 is oriented in a vehicle-forward direction (e.g., outwardly from the vehicle 14) and may form a continuous surface with the exterior surface 110 of the vehicle 14. The rear surface 30 may be oriented in a vehicle-rearward direction (e.g., inwardly into the engine compartment 90). In various examples, the center portion 126 of the housing 22 may include the lens 138. The lens 138 may be coupled to the housing 22 or, alternatively, may be integrally formed within the housing 22. The lens 138 may be visually distinguishable from the housing 22 or may be visually integrated into the housing 22 such that the housing 22 and the lens 138 appear to be a unitary component. Additionally or alternatively, the entire housing 22 may be configured as the lens 138. The lens 138 may be included adjacent to the display assembly 38, which may be disposed in the grille assembly 10. The housing 22 and/or the lens 138 may include at least partially light transmissible materials. The housing 22 and/or the lens 138 may also be tinted, frosted, or stained. Further, the housing 22 and/or the lens 138 may be configured to be at least partially light transmissive when the light 54 from the display assembly 38 is emitted towards the housing 22 and/to the lens 138 but may appear opaque when minimal or no light 54 is emitted. In this way, the housing 22 may appear as a solid, opaque panel when the display assembly 38 is deactivated (e.g., not emitting light 54), and the display assembly 38 can be viewed when activated (e.g., emitting light 54).

As illustrated in FIG. 2, the rear surface 30 of the housing 22 may define the cutout 34. The cutout 34 is illustrated as having a rectangular shape, however, any useful or practicable shape may be used. The cutout 34 may correspond with the size and/or shape of the display assembly 38. In this way, the display assembly 38 may be aligned with and/or positioned within the cutout 34. Additionally or alternatively, the cutout 34 may be defined in the center portion 126 of the housing 22, as illustrated in FIG. 2, or, alternatively, may be defined in at least one of the lateral side portions 130. Further, more than one cutout 34 may be defined to correspond with interchangeable and/or more than one display assembly 38. Additionally or alternatively, the cutout 34 may be sealed with a gasket, direct seam, or other similar configuration to enclose the display assembly 38 within the housing 22. It is also contemplated that the display assembly 38 may also be spaced-apart from the rear surface 30 of the housing 22, but be aligned with the cutout 34. It is also contemplated that the housing 22 may not define the cutout 34. In such examples, the display assembly 38 may be disposed adjacent to the rear surface 30 of the housing 22.

Figure 3:
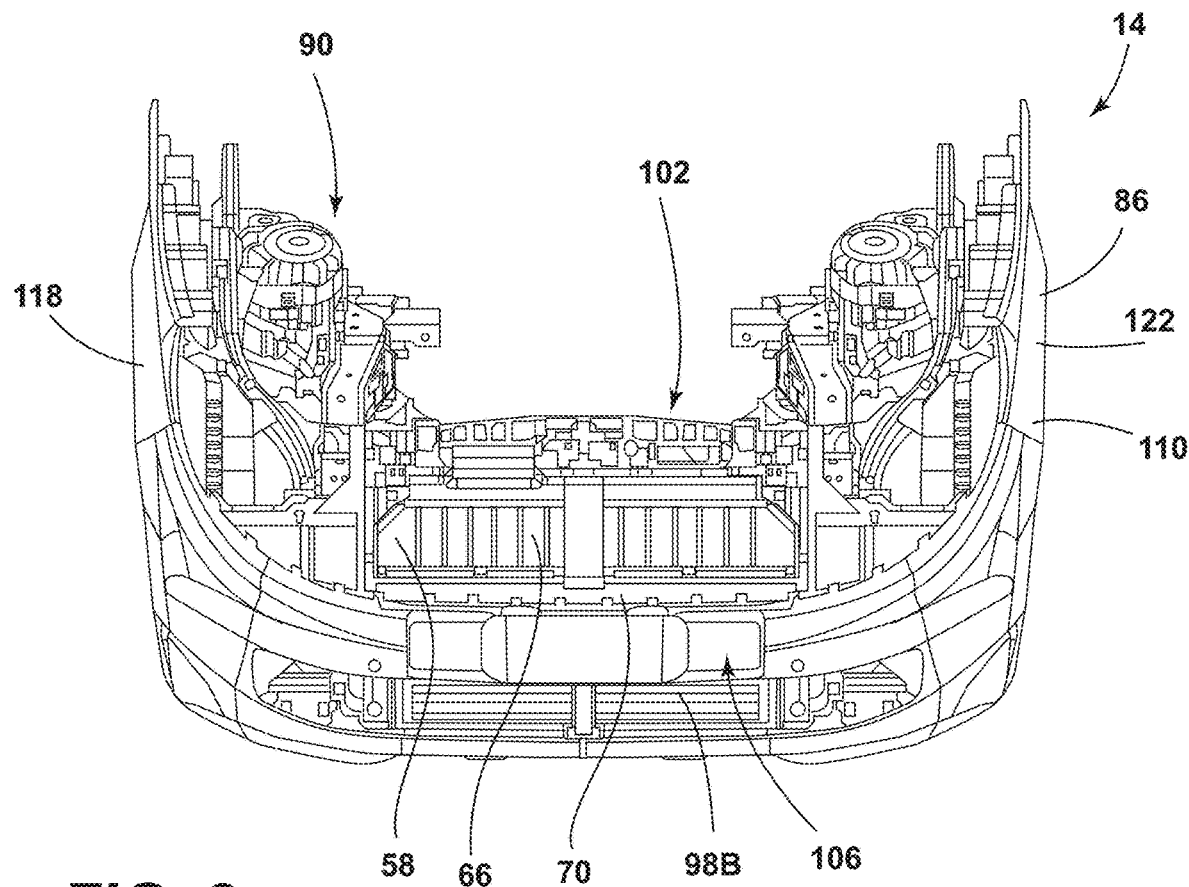
FIG. 3 is a top perspective view of a front portion of a vehicle with a hood removed, according to one example.

Referring to FIGS. 1 and 3, the vehicle 14 may include a first grille 98A and a second grille 98B in a vertically-stacked configuration defined in the vehicle-forward portion 86 of the vehicle 14. The first grille 98A may be smaller than the second grille 98B. Additionally or alternatively, the first grille 98A may be disposed adjacent to the center portion 126 of the housing 22. The vehicle-forward portion 86 of the vehicle 14 is illustrated in FIG. 3 with the hood 94 removed and showing the deflector 58 disposed in the engine compartment 90. The deflector 58 may be disposed within the engine compartment 90 proximate the first grille 98A. Additionally or alternatively, the deflector 58 may be disposed in a vertically stacked configuration with, and offset from, the second grille 98B. Both the first and second grilles 98A, 98B and the deflector 58 may be advantageous for increased ventilation of the engine compartment 90. It is also contemplated that the vehicle 14 may include a single grille 98 configured as either the first grille 98A or the second grille 98B.

Figure 4:
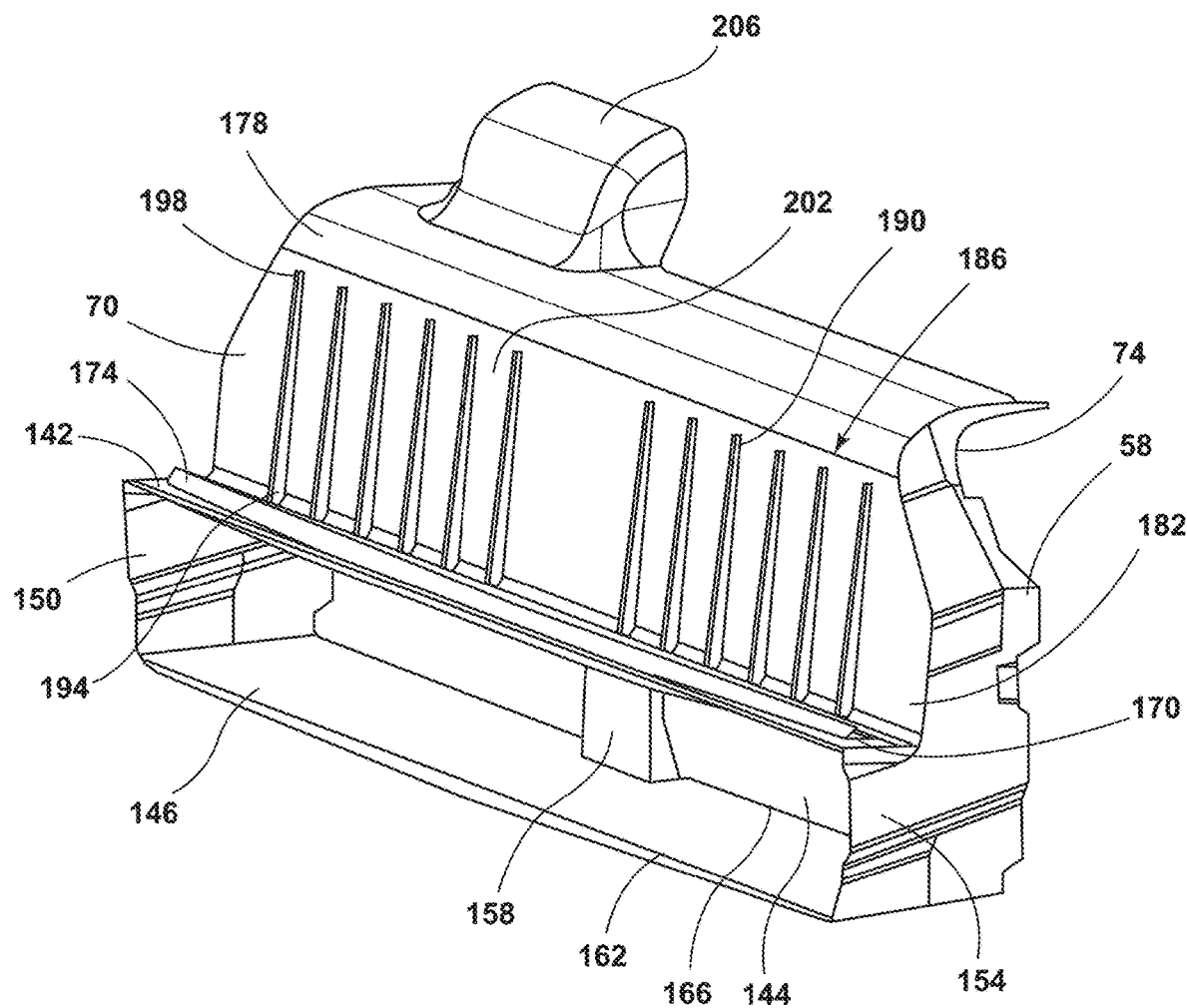
FIG. 4 is a side perspective view of a deflector, according to one example.

Referring to FIG. 4, the deflector 58 may include the base 62 and the guide wall 66 extending vertically upwards from the base 62. In various examples, the guide wall 66 extends substantially perpendicular from an upper wall 142 of the base 62. The base 62 defines an opening 144, which defines at least a portion of the first airflow path 78. Stated differently, the first airflow path 78 extends through the opening 144 defined by the deflector 58. The base 62 may include the upper wall 142 and a lower wall 146 spaced-apart by opposing sidewalls 150, 154. The base 62 may also include a support 158 disposed between the opposing sidewalls 150, 154 and extending between the upper and lower walls 142, 146. The upper wall 142 may be obliquely-oriented relative to the lower wall 146. In such examples, the opening 144 may taper such that an inlet 162 of the opening 144 defines in the first surface 70 of the deflector 58 is larger than an outlet 166 of the opening 144 defined in the second surface 74 of the deflector 58.

In various examples, the upper wall 142 defines a slot 170 extending at least a portion of a width of the base 62. The slot 170 may be configured as a single slot 170 or as a plurality of slots 170 spaced-apart along the upper wall 142 of the base 62. A guide flange 174 may extend from the upper wall 142 proximate the slot 170. The guide flange 174 may extend at an obtuse angle relative to the upper wall 142, and extend and at least partially over the slot 170 (e.g., towards the guide wall 66). In this way, the guide flange 174 may direct air from the slot 170 towards the guide wall 66. Stated differently, the opening 144 and the slot 170 may be in fluid communication via the first airflow path 78.

According to various aspects, the deflector 58 may also define the second airflow path 82 proximate the first surface 70 of the guide wall 66. The guide wall 66 includes an upper portion 178 and a lower portion 182, wherein the lower portion 182 may be coupled to the upper wall 142 of the base 62. According to various aspects, the deflector 58 may include a plurality of ribs 186 composed of individual ribs 190 extending from the first surface 70. The ribs 190 extend vertically between the upper and lower portions 178, 182 of the guide wall 66. In various examples, the ribs 190 may be coupled to the upper wall 142 of the base 62 or, alternatively, may be spaced-apart from the upper wall 142. The ribs 190 may taper such that bottoms 194 of the ribs 190 proximate the base 62 extend further from the first surface 70 of the guide wall 66 than tops 198 of the ribs 190 proximate the upper portion 178 of the guide wall 66.

According to various aspects, the ribs 190 may be spaced apart from one another and arranged in a parallel configuration. In this way, adjacent ribs 190 may define channels 202 therebetween. Stated differently, the plurality of ribs 186 may define multiple channels 202 extending substantially vertically between the lower portion 182 and the upper portion 178 of the guide wall 66. The channels 202 may define at least a portion of the second airflow path 82. The second airflow path 82 may extend from proximate the upper wall 142 of the base 62 through the channels 202 along the guide wall 66 to proximate the upper portion 178 of the guide wall 66. Any number of ribs 190 may be included on the deflector 58 depending on the selected configuration of the second airflow path 82. In various examples, the ribs 190 may straighten the vertical flow of the second airflow path 82 through the channels 202. Additionally or alternatively, the ribs 190 may provide increased strength to the deflector 58 for withstanding air pressure resulting from the first and/or second airflow paths 78, 82.

Referring to FIGS. 3 and 4, the first surface 70 of the deflector 58 may correspond a vehicle-forward surface and the second surface 74 may correspond with a vehicle-rearward surface. In this way, the ribs 190 may extend in a vehicle-forward direction. The upper portion 178 of the guide wall 66 may also curve away from the ribs 190 in a vehicle-rearward direction. This configuration may define at least a portion of the selected configuration of the second airflow path 82. Additionally or alternatively, the curved upper portion 178 of the deflector 58 may provide a laminar surface to promote the laminar flow of the air along the second airflow path 82 over the deflector 58.

In various examples, the first airflow path 78 may be in fluid communication with the second airflow path 82 via the slot 170. In this way, air may travel into the opening 144 of the base 62 through the inlet 162 and continue as part of the first airflow path 78 through the outlet 166 of the opening 144. Additionally or alternatively, air may travel through the inlet 162 of the opening 144 and through the slot 170 defined in the upper wall 142 of the base 62 and continue as part of the second airflow path 82 along the guide wall 66. Moreover, the upper portion 178 of the deflector 58 may include an induction inlet 206 extending vertically therefrom. The induction inlet 206 may be included in the second airflow path 82 or may define a separate airflow path. Air can enter the induction inlet 206 and travel vertically downwards proximate to the second surface 74 of the deflector 58 and/or within the deflector 58.

Figure 5:
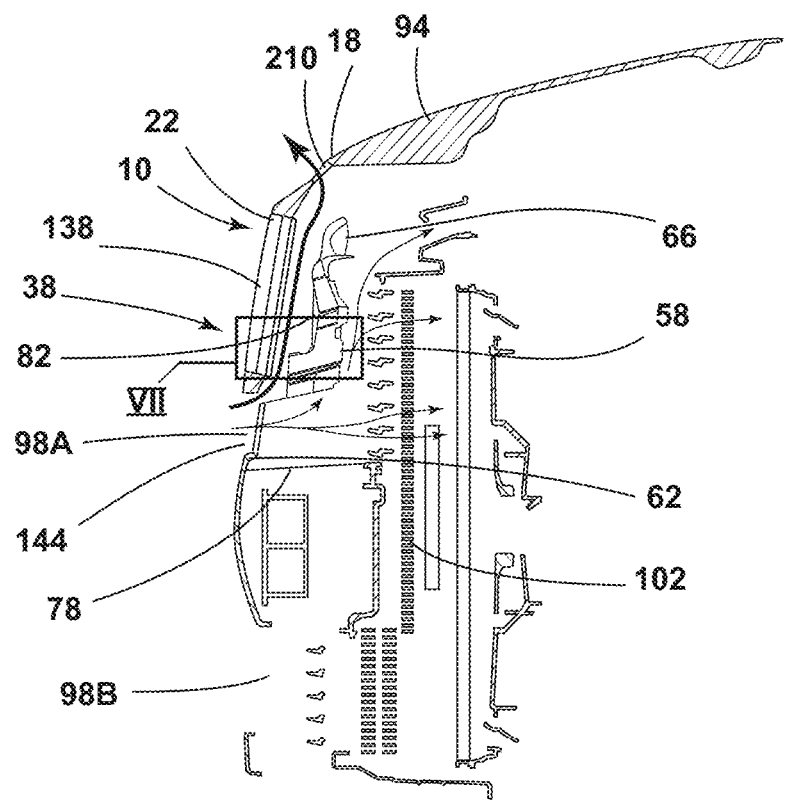
FIG. 5 is a cross-sectional view of a front portion of the vehicle of FIG. 1 taken along line V-V.

Referring to FIG. 5, the deflector 58 is disposed between the display assembly 38 and the cooling system 102. As illustrated, the cooling system 102 may have a substantially vertical orientation within the vehicle-forward portion 86 of the vehicle 14. The first grille 98A may align with the base 62 of the deflector 58. The deflector 58 may be spaced-apart from the first grille 98A, such that air may travel along both the first and second airflow paths 78, 82. The first airflow path 78 may extend from the first grille 98A through the opening 144 defined in the base 62 to proximate the second surface 74 of the deflector 58. According to various aspects, the first airflow path 78 may provide air to proximate the cooling system 102. The first airflow path 78 may transfer heat away from the engine compartment 90 in conjunction with the cooling system 102. Additionally or alternatively, the first airflow path 78 may provide cooler ambient air to the cooling system 102.

According to various aspects, the second airflow path 82 may extend from the first grille 98A over the upper wall 142 of the base 62 and upwards through the channels 202 and along the guide wall 66. Additionally or alternatively, air from the first airflow path 78 may pass through the slot 170 and be directed by the guide flange 174 into the second airflow path 82. The second airflow path 82 extends, at least partially between the display assembly 38 and the deflector 58. The display assembly 38 may generate heat when activated and/or operating. The second airflow path 82 may provide flowing ambient air proximate to the display assembly 38 and may operate to transfer heat away from the display assembly 38. The heat may be transferred away from the display assembly 38 in a direction away from the cooling system 102. In various examples, the body panel 18 and the housing 22 define a gap 210 therebetween. The second airflow path 82 may extend through the gap 210, allowing heat from the display assembly 38 to be directed to an area exterior of the vehicle 14. In this way, the first grille 98A may be in fluid communication with the gap 210 via the second airflow path 82. Moreover, the orientation of the second airflow path 82 may be advantageous for providing a chimney-effect proximate to the display assembly 38, which may result from air blowing into the first grille 98A while the vehicle 14 is in motion. The first and second airflow paths 78, 82 may be advantageous for transferring heat away from the display assembly 38 and providing airflow to the cooling system 102.

Figure 6:
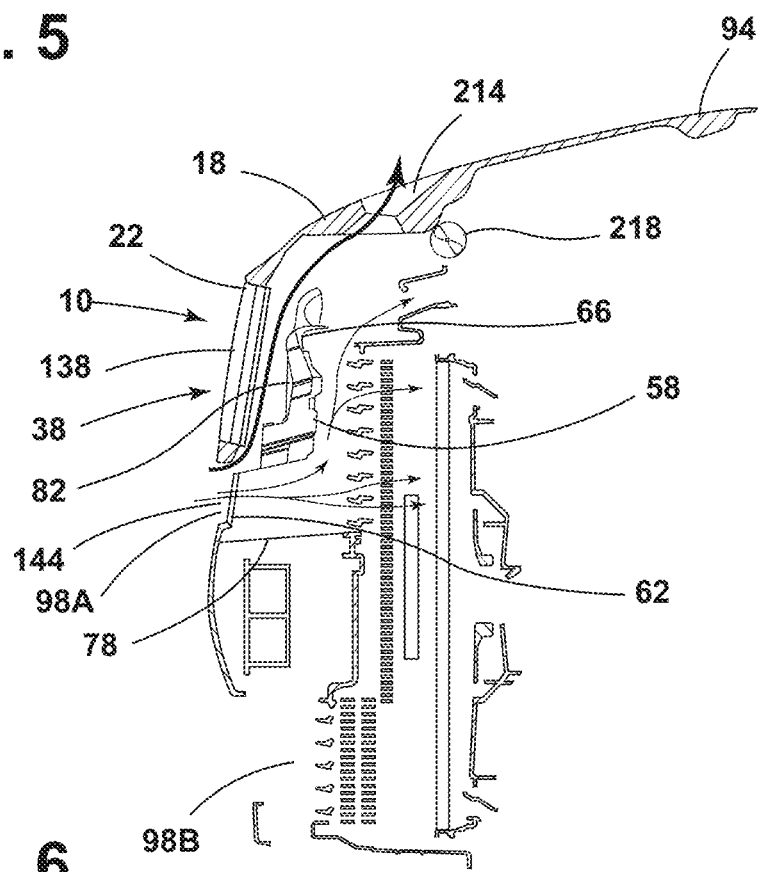
FIG. 6 is a cross-sectional view of a front portion of the vehicle of FIG. 1 taken along line V-V.

Referring to FIG. 6, an additional and/or alternative configuration of the second airflow path 82 is illustrated. In various examples, the housing 22 and the body panel 18 may not define the gap 210 therebetween. In such examples, the body panel 18 may define a hood vent 214 with and/or proximate to the hood 94. A fan 218 may be disposed proximate to the hood vent 214 for guiding the air through the hood vent 214. The fan 218 may be a submersible fan 218 or any other similar device that guides air. Such configurations may be advantageous for minimizing hot vent air recirculation. Stated differently, this configuration with the hood vent 214 and the fan 218 may minimize hot air exiting the vehicle 14 through the second airflow path 82 from recirculating into the first and/or second airflow paths 78, 82.

Figure 7:
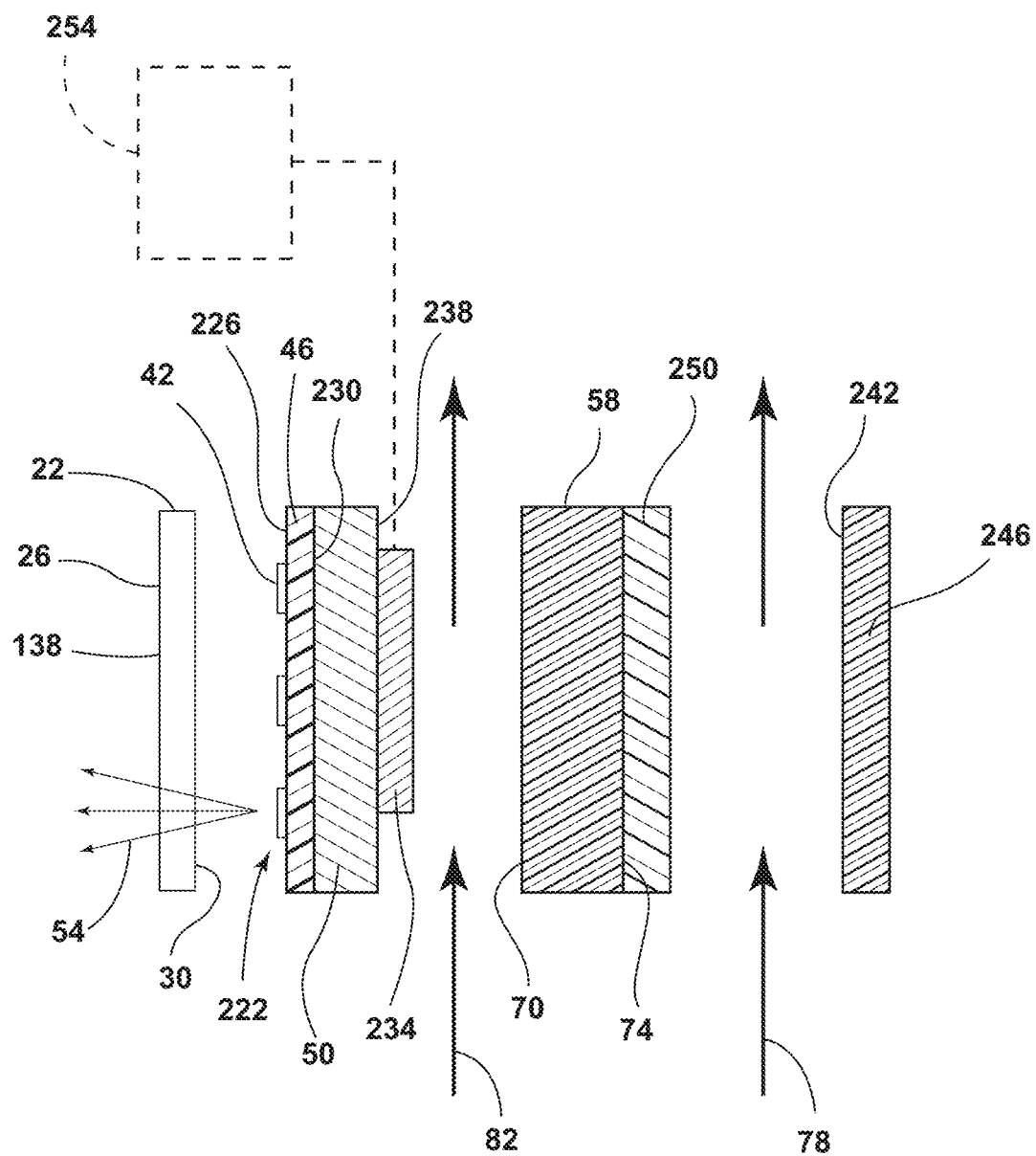
FIG. 7 is an enlarged view of first and second airflow paths of FIG. 5 taken at area VII.

Referring to FIG. 7, the display assembly 38 may include a plurality of light sources 222 composed of the individual light sources 42. The light sources 42 may be disposed on a first side 226 of the circuit board. The light sources 42 may be arranged in any configuration on the first side 226 of the circuit board 46 that is useful and practicable for generating a selected display or message. The circuit board 46 may be configured as one or more circuits, a printed circuit board, or other similar circuits. The circuit board 46 may be rigid or flexible circuits. In various examples, the circuit board 46 may include thermally conductive plastic materials. For example, the circuit board 46 may include polybutylene terephthalate (PBT) with additives to increase the thermal conductivity of the PBT. To increase the conductivity of the plastic materials, a specialty carbon black material, and/or graphite material may be added. In a carbon black material example, approximately 5-10% by volume of ENASCO® 350G manufactured by Imerys can be added to the plastic materials. In a graphite material example, about 20-30% by volume of TIMREX® C-THERM™ manufactured by Imerys can be added to the plastic materials. These carbon and graphite materials may increase thermal conductivity of the PBT by a factor of approximately twenty. Additionally or alternatively, approximately 1-5% by volume of maleic anhydride may be incorporated into the plastic materials to compatibilize the ceramic additives with the base polymer (e.g., PBT). The thermally conductive plastic materials may be advantageous for transferring heat from the light sources 42 to the heatsink 50, where the heat can then dissipate into the second airflow path 82. However, these examples are non-limiting. As such, the circuit board 46 may include any practicable material or combination of materials.

The light sources 42 may include any form of light source 42. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the grille assembly 10. Further, various types of LEDs are suitable for use as the light sources 42 including, but not limited to, top-emitting LEDs, side-emitting LEDs, and others. Moreover, according to various examples, multicolored light sources 42, such as Red, Green, and Blue (RGB) LEDs that employ red, green, and blue LED packaging may be used to generate various desired colors of light outputs from a single light source 42, according to known light color mixing techniques.

The display assembly 38 may also include the heatsink 50 coupled to a second side 230 of the circuit board 46 opposite of the first side 226 having the light sources 42. The light sources 42, while producing the emitted light 54, also emit heat. As heat is emitted from the light sources 42, the heatsink 50 captures at least a portion of this heat. The captured heat may be temporarily retained within elongated members 234 of the heatsink 50. The captured heat within the heatsink 50 migrates to areas that have a lower temperature than the heatsink 50. In various aspects, the heat may be transferred to the ambient air of the second airflow path 82. As such, the heatsink 50, after absorbing heat from the light sources 42, exchanges, or transfers heat to cooler regions in and around the display assembly 38. The heatsink 50 may extend out of the cutout 34 of the housing 22 toward the deflector 58. Accordingly, the heatsink 50 may dissipate heat into the second airflow path 82 defined between the display assembly 38 and the deflector 58 to increase the efficiency of the heatsink 50.

In the various examples, the elongated members 234 of the heatsink 50 can extend generally perpendicular to a back portion 238 of the heatsink 50. In such an example, the elongated members 234 can be linear or can include various angled and/or curved portions. It is contemplated that, in various instances, the elongated members 234 can extend in an angled configuration or a curved configuration, or both, relative to the back portion 238 of the heatsink 50. It is further contemplated that each elongated member 234 can have configurations that can include, but are not limited to, linear, curved, angled, and trapezoidal, among other configurations. Additionally, various cross members can be included that extend across the elongated members 234 to add structure to the elongated members 234 and also add surface area through which heat can be transferred from the display assembly 38. It is also contemplated that the elongated members 234 may not have a consistent length. Such configurations may include a triangular profile, a trapezoidal profile, a curved profile, an irregular profile, among other similarly shaped profiles. Various examples of the heatsink 50 may also include more than one row of the elongated members 234, such as an inner layer and outer layer of the elongated members 234. In the various examples, the heatsink 50 can be made of various materials that have a high thermal conductivity. Such materials can include but are not limited to, aluminum, aluminum alloys, copper, composite materials that incorporate materials having a high thermal conductivity, combinations thereof, and other materials that are at least partially thermally conductive.

Referring still to FIG. 7, the display assembly 38 may be disposed adjacent to the housing 22. The first side 226 of the circuit board 46 with the light sources 42 may be oriented towards the rear surface 30 of the housing 22 and/or the lens 138. The light sources 42 may be configured to emit the light 54 towards the rear surface 30 of the housing 22 and/or the lens 138. Moreover, the light sources 42 may emit the light 54 through the lens 138 and/or the housing 22 to illuminate a display, message, pattern, or other indicia on the display assembly 38. The display assembly 38 may also be disposed adjacent to the deflector 58. In such examples, the guide wall 66 may be disposed adjacent to the heatsink 50. Stated differently, the deflector 58 may be spaced-apart from the heatsink 50 and may be disposed proximate to the second side 230 of the circuit board 46. The deflector 58 and the display assembly 38 may define the second airflow path 82 therebetween.

In various examples, the first airflow path 78 may be defined in a vehicle-rearward position relative to the second airflow path 82. The first airflow path 78 may extend proximate the second surface 74 of the deflector 58. Additionally or alternatively, the first airflow path 78 may extend through a duct 242. In this way, the duct 242 may be in fluid communication with the opening 144 defined by the base 62 of the deflector 58. According to various aspects, the deflector 58 may at least partially define the duct 242. In this way, the deflector 58 may include a duct wall 246 spaced-apart from the second surface 74 of the deflector 58. The duct wall 246 may be integrally formed with the guide wall 66 and/or the base 62 of the deflector or, alternatively, may be coupled to the deflector 58. Additionally or alternatively, the duct wall 246 may be a separate component disposed proximate to the second surface 74 of the deflector 58.

Referring still to FIG. 7, the deflector 58 and the duct wall 246 may include plastic materials. The plastic materials may be, for example, PBT and/or polypropylene (PP). The PBT and/or PP of the deflector 58 and/or the duct wall 246 may have reduced thermal conductivity. In this way, additives may be included with the plastic materials to reduce the thermal conductivity. In various aspects, the deflector 58 may include an insulating layer 250 disposed on the second surface 74 of the deflector 58. The insulating layer 250 may be coupled to the second surface 74 and/or be configured as the second surface 74 of the deflector 58 (e.g., integrally formed). For example, 1-3% by volume of a chemical foaming agent may be added to the plastic materials. The foaming agent may be, for example, Foamazol™ 72 Chemical Foaming Agent manufactured by Bergen International or other similar foaming agents. The foaming agent additive may be an endothermic foaming agent that creates a fine microcellular structure that is approximately 20% foam.

Additionally or alternatively, gas may be directly injected into the plastic materials. For example, microcellular foams manufactured by Mucell® may also be used. Air pockets formed by the gas may reduce heat transfer in the plastic materials. The structural foam process is a low-pressure injection molding process where an inert gas is introduced into a melted polymer (e.g., the PBT and/or PP) to reduce density and weight of the finished product. Typically, structural foam molded components have cellular cores surrounded by rigid, integral skins. Foaming agents may be introduced into the polymer melt stream, forming a homogenous mixture of gas and polymer. The mixture may be short-shot injected into a mold. In various examples, through additives and/or injections, the thermal conductivity of the plastic materials may be reduced by a factor of approximately four. In this way, the duct wall 246 and the insulating layer 250 may both operate as a heat shield to resist heat produced by the engine of the vehicle 14. In this way, there is a single heat shield between the engine and the first airflow path 78 and two heat shields between the engine and the second airflow path 82. This configuration may be advantageous to minimize heat transference from the engine to and/or interfering with the cooling system 102 and/or the display assembly 38.

The deflector 58 and the duct wall 246 may be manufactured using a two-shot injection molding process. For example, the deflector 58, including the insulating layer 250, may be formed using a first shot of injection molding, and the ribs 190 disposed on the guide wall 66 may be formed using a second shot of injection molding. The duct wall 246 may be separately molded. Additionally or alternatively, the deflector 58 and the duct wall 246 may be formed using the first shot, and the insulating layer 250 and the ribs 190 may be formed with the second shot. Various other manufacturing processes, such as single-shot injection molding or ultrasonic welding, are also contemplated without departing from the teachings herein.

Referring still to FIG. 7, the display assembly 38 may be operably coupled to a controller 254. The controller 254 may include a processor, other control circuitry, and a memory. Instructions may be stored in the memory and may be executable by the processor. The instructions may include at least one instruction for selectively activating and/or deactivating the light sources 42. The controller 254 may selectively and/or independently activate each of the individual light sources 42 of the plurality of light sources 222. The light sources 42 may be activated by the controller 254 to illuminate a message, symbol, design, pattern, word, other indicia, etc. or may be illuminated randomly. The illumination resulting from the emitted light 54 may be viewed through the housing 22 and/or the lens 138. The light sources 42 may be activated and/or deactivated in response to a function, mode, status of the vehicle 14, or other feature. Additionally, the light sources 42 may be activated and/or deactivated in response to a selection made by a user through a user-interface.

Use of the present disclosure may provide a variety of advantages. For example, the deflector 58 may provide for the first and second airflow paths 78, 82 for dissipating heat. The first airflow path 78 may increase cooler ambient air provided to the cooling system 102. The second airflow path 82 may cool the display assembly 38 by allowing heat generated by the display assembly 38 to be dissipated into flowing ambient air. In this way, the heat may be transferred from the display assembly 38 to the ambient air in the second airflow path 82. Additionally, the deflector 58, including the insulating layer 250 and the duct 242 may minimize heat transferred from the engine to the display assembly 38. The deflector 58, including the insulating layer 250, may also minimize heat transfer from the display assembly 38 to the cooling system 102. Further, the configuration of the grille assembly 10 may minimize recirculation of hot air back into the grille 98 through the first and/or second grilles 98A, 98B. Additional benefits or advantages of using this device may also be realized and/or achieved.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

According to various examples, vehicle grille assembly includes a body panel and a housing coupled to the body panel. The housing includes a front surface and a rear surface. The rear surface defines a cutout. A display assembly is disposed adjacent to the housing and aligned with the cutout. The display assembly includes a light source disposed on a circuit board and a heatsink coupled to the circuit board. The light source emits light towards the front surface of the housing. A deflector is disposed adjacent to the display assembly and includes a base and a guide wall extending vertically from the base. The deflector includes a first surface and a second surface. The deflector defines a first airflow path and a second airflow path. Embodiments of the present disclosure may include one or a combination of the following features:
- a housing includes a lens integrally formed with the front surface and disposed adjacent to the display assembly. A light source emits light towards the lens;
- a base of the deflector defines an opening defining a first airflow path. The first airflow path extends from proximate a first surface of a deflector through the opening to proximate a second surface of the deflector;
- a deflector includes a plurality of spaced-apart ribs disposed on a first surface of a guide wall. Each rib of the plurality of spaced-apart ribs extends vertically between a lower portion of the guide wall and an upper portion of the guide wall;
- adjacent ribs of a plurality of spaced-apart ribs define channels to define a second airflow path. The second airflow path extends from proximate a lower portion of a guide wall through the channels to proximate an upper portion of the guide wall;
- a body panel defines a gap in fluid communication with a second airflow path;
- a deflector includes an insulating layer disposed on a second surface;
- a deflector at least partially defines a duct. An opening defined by a base is in fluid communication with the duct via a first airflow path;
- a duct wall disposed proximate to and spaced-apart from a second surface of a deflector to define a duct; and
- a duct wall is integrally formed with the deflector.

According to various examples, a grille assembly for a vehicle includes a circuit board having a first side and a second side. The first side opposes the second side. A plurality of light sources is disposed on the first side the circuit board. A lens is disposed adjacent to the plurality of light sources. Each light source of the plurality of light sources is configured to emit light towards the lens. A heatsink is coupled to the second side of the circuit board. A deflector has a base and a guide wall and is disposed proximate to the heatsink. The deflector defines at least one airflow path. A controller is configured to selectively activate each light source of the plurality of light sources. Embodiments of the present disclosure may include one or a combination of the following features:
- a deflector is spaced-apart from a heatsink. At least one airflow path is defined between the heatsink and the deflector;
- a deflector includes a first surface and a second surface. The first surface of the deflector defines a plurality of ribs spaced-apart from one another in a parallel configuration;
- a base defines an opening. A guide wall extends vertically from the base;
- at least one airflow path defines a first airflow path that extends through an opening of a base and a second airflow path that extends proximate a guide wall;
- a guide wall includes an upper portion and a lower portion. The upper portion of the guide wall curves away from a heatsink;
- an upper portion of the guide wall includes an induction inlet.

According to various examples, a grille assembly includes a circuit board having a first side and a second side. A light source is disposed on the first side of the circuit board. A lens is disposed adjacent to the light source. The light source is configured to emit light through the lens. A deflector is disposed proximate the second side of the circuit board. The deflector includes a base and a guide wall extending from the base. The deflector is spaced-apart from the second side of the circuit board to define an airflow path therebetween. Embodiments of the present disclosure may include one or a combination of the following features:
- a guide wall includes a rib extending from a lower portion of a guide wall to an upper portion of a guide wall; and
- an airflow path extends from proximate a base of a deflector to an upper portion of a guide wall.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any two components associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle grille assembly, comprising:
a body panel;
a housing coupled to the body panel, wherein the housing includes a front surface and a rear surface, and wherein the rear surface defines a cutout;
a display assembly disposed adjacent to the housing and aligned with the cutout, wherein the display assembly includes a light source disposed on a circuit board and a heatsink coupled to the circuit board, and wherein the light source emits light towards the front surface of the housing; and
a deflector disposed adjacent to the display assembly and including a base and a guide wall extending vertically from the base, wherein the deflector includes a first surface and a second surface, and wherein the deflector defines a first airflow path and a second airflow path.

2. The vehicle grille assembly of claim 1, wherein the housing includes a lens integrally formed with the front surface and disposed adjacent to the display assembly, and wherein the light source emits light towards the lens.

3. The vehicle grille assembly of claim 1, wherein the base of the deflector defines an opening defining the first airflow path, and wherein the first airflow path extends from proximate the first surface of the deflector through the opening to proximate the second surface of the deflector.

4. The vehicle grille assembly of claim 1, wherein the deflector includes a plurality of spaced-apart ribs disposed on the first surface of the guide wall, and wherein each rib of the plurality of spaced-apart ribs extends vertically between a lower portion of the guide wall and an upper portion of the guide wall.

5. The vehicle grille assembly of claim 4, wherein adjacent ribs of the plurality of spaced-apart ribs define channels to define the second airflow path, and wherein the second airflow path extends from proximate the lower portion of the guide wall through the channels to proximate an upper portion of the guide wall.

6. The vehicle grille assembly of claim 1, wherein the body panel defines a gap in fluid communication with the second airflow path.

7. The vehicle grille assembly of claim 1, wherein the deflector includes an insulating layer disposed on the second surface.

8. The vehicle grille assembly of claim 1, wherein the deflector at least partially defines a duct, and wherein an opening defined by the base is in fluid communication with the duct via the first airflow path.

9. The vehicle grille assembly of claim 8, further comprising:
a duct wall disposed proximate to and spaced-apart from the second surface of the deflector to define the duct.

10. The vehicle grille assembly of claim 9, wherein the duct wall is integrally formed with the deflector.

11. A grille assembly for a vehicle, comprising:
a circuit board having a first side and a second side, wherein the first side opposes the second side;
a plurality of light sources disposed on the first side the circuit board;
a lens disposed adjacent to the plurality of light sources, wherein each light source of the plurality of light sources is configured to emit light towards the lens;
a heatsink coupled to the second side of the circuit board;
a deflector having a base and a guide wall and disposed proximate to the heatsink, wherein the deflector defines at least one airflow path; and
a controller configured to selectively activate each light source of the plurality of light sources.

12. The grille assembly of claim 11, wherein the deflector is spaced-apart from the heatsink, and wherein the at least one airflow path is defined between the heatsink and the deflector.

13. The grille assembly of claim 11, wherein the deflector includes a first surface and a second surface, and wherein the first surface of the deflector defines a plurality of ribs spaced-apart from one another in a parallel configuration.

14. The grille assembly of claim 11, wherein the base defines an opening, and wherein the guide wall extends vertically from the base.

15. The grille assembly of claim 14, wherein the at least one airflow path defines a first airflow path that extends through the opening of the base and a second airflow path that extends proximate the guide wall.

16. The grille assembly of claim 11, wherein the guide wall includes an upper portion and a lower portion, and wherein the upper portion of the guide wall curves away from the heatsink.

17. The grille assembly of claim 16, wherein the upper portion of the guide wall includes an induction inlet.

18. A grille assembly, comprising:
a circuit board having a first side and a second side;
a light source disposed on the first side of the circuit board;
a lens disposed adjacent to the light source, wherein the light source is configured to emit light through the lens;
a heatsink coupled to the second side of the circuit board; and
a deflector disposed proximate the heatsink, wherein the deflector includes a base and a guide wall extending from the base, and wherein the deflector is entirely spaced-apart from the heatsink to define an airflow path therebetween.

19. The grille assembly of claim 18, wherein the guide wall includes a rib extending from a lower portion of the guide wall to an upper portion of the guide wall.

20. The grille assembly of claim 18, wherein the airflow path extends from proximate the base of the deflector to an upper portion of the guide wall.

* * * * *